US012766711B2

(12) United States Patent
Cachet et al.

(10) Patent No.: US 12,766,711 B2
(45) Date of Patent: Oct. 20, 2026

(54) BRIDGING LANGUAGE AND ENVIRONMENTS WITH RENDERING FUNCTIONS AND VISION-LANGUAGE MODELS

(71) Applicant: NAVER CORPORATION, Gyeonggi-do (KR)

(72) Inventors: Theo Cachet, Grenoble (FR); Christopher Dance, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 92 days.

(21) Appl. No.: 18/663,491

(22) Filed: May 14, 2024

(65) Prior Publication Data

US 2025/0353166 A1 Nov. 20, 2025

(51) Int. Cl.
*B25J 9/16* (2006.01)

(52) U.S. Cl.
CPC ............... *B25J 9/163* (2013.01); *B25J 9/161* (2013.01); *B25J 9/1664* (2013.01)

(58) Field of Classification Search
CPC . B25J 9/163; B25J 9/161; B25J 9/1664; B25J 9/00; B25J 9/16; B25J 9/1605; B25J 9/1602; B25J 9/1653; B25J 9/1658
See application file for complete search history.

(56) References Cited

U.S. PATENT DOCUMENTS

2021/0053216 A1* 2/2021 Diankov ................ B25J 9/1669
2023/0015238 A1* 1/2023 Clark ..................... B25J 9/1697
2024/0198526 A1* 6/2024 Aparicio Ojea ....... B25J 9/1669
2024/0311617 A1* 9/2024 Di Palo .................. G06N 3/045
2025/0178199 A1* 6/2025 Longo .................... B25J 9/1676
2025/0319593 A1* 10/2025 Wang ..................... B25J 9/1666

FOREIGN PATENT DOCUMENTS

JP 2022009697 A * 1/2022

OTHER PUBLICATIONS

Khaldi et al., "Flexible and Efficient Topological Approaches for a Reliable Robots Swarm Aggregation," Jul. 23, 2019 (Year: 2019).*
Thrun, "A Probabilistic On-Line Mapping Algorithm for Teams of Mobile Robots," May 2001 (Year: 2001).*
(Continued)

*Primary Examiner* — Adam R Mott
*Assistant Examiner* — Byron Xavier Kasper

(57) ABSTRACT

A robot system includes: image encodings generated based on renderings of configurations, respectively of a robot, the configurations including at least a predetermined number of different poses of the robot in an environment; an encoding module configured to receive text descriptive of an action to be performed by the robot and to encode the text into a text encoding; a scoring module configured to generate scores for the configurations based on comparisons of (a) the text encoding with (b) the image encoding of the respective configuration; a selection module configured to select k of the configurations based on the scores, where k is an integer greater than or equal to 1; and an actuation module configured to actuate the robot based on the selected k of the configurations based on actuating the robot to achieve the action described in the text.

21 Claims, 11 Drawing Sheets

(56) References Cited

OTHER PUBLICATIONS

Achiam, J., Adler, S., Agarwal, S., Ahmad, L., Akkaya, I., Aleman, F. L., Almeida, D., Altenschmidt, J., Altman, S., Anadkat, S., et al. GPT-4 technical report. arXiv:2303.08774, 2023.
Adeniji, A., Xie, A., Sferrazza, C., Seo, Y., James, S., and Abbeel, P. Language reward modulation for pretraining reinforcement learning, 2023.
Ajay, A., Han, S., Du, Y., Li, S., Gupta, A., Jaakkola, T., Tenenbaum, J., Kaelbling, L., Srivastava, A., and Agrawal, P. Compositional foundation models for hierarchical planning. arXiv:2309.08587, 2023.
Akakzia, A., Colas, C., Oudeyer, P., Chetouani, M., and Sigaud, O. Grounding language to autonomously acquired skills via goal generation. In International Conference on Learning Representations, 2021.
Andrychowicz, M., Wolski, F., Ray, A., Schneider, J., Fong, R., Welinder, P., McGrew, B., Tobin, J., Pieter Abbeel, O., and Zaremba, W. Hindsight experience replay. Advances in Neural Information Processing Systems, 30, 2018.
Bahdanau, D., Hill, F., Leike, J., Hughes, E., Hosseini, A., Kohli, P., and Grefenstette, E. Learning to understand goal specifications by modelling reward. arXiv preprint arXiv:1806.01946, 2018.
Baumli, K., Baveja, S., Behbahani, F., Chan, H., Comanici, G., Flennerhag, S., Gazeau, M., Holsheimer, K., Horgan, D., Laskin, M., et al. Vision-language models as a source of rewards. arXiv preprint arXiv:2312.09187, 2023.
Brockman, G., Cheung, V., Pettersson, L., Schneider, J., Schulman, J., Tang, J., and Zaremba, W. Openai gym. arXiv preprint arXiv:1606.01540, 2016.
Brooks, T., Holynski, A., and Efros, A. A. Instructpix2pix: Learning to follow image editing instructions. In Proceedings of the IEEE/CVF Conference on Computer Vision and Pattern Recognition, pp. 18392-18402, 2023.
Bubeck, S., Chandrasekaran, V., Eldan, R., Gehrke, J., Horvitz, E., Kamar, E., Lee, P., Lee, Y. T., Li, Y., Lundberg, S., et al. Sparks of artificial general intelligence: Early experiments with gpt-4. arXiv preprint arXiv:2303.12712, 2023.
Chen, S., Garcia, R., Schmid, C., and Laptev, I. Polarnet: 3d point clouds for language-guided robotic manipulation. arXiv preprint arXiv:2309.15596, 2023.
Chu, E., Lin, S.-Y., and Chen, J.-C. Video controlnet: Towards temporally consistent synthetic-to-real video translation using conditional image diffusion models. arXiv preprint arXiv:2305.19193, 2023.
Cobbe, K., Hesse, C., Hilton, J., and Schulman, J. Leveraging procedural generation to benchmark reinforcement learning. In International conference on machine learning, pp. 2048-2056. PMLR, 2020.
Colas, C., Akakzia, A., Oudeyer, P.-Y., Chetouani, M., and Sigaud, O. Language-conditioned goal generation: a new approach to language grounding for rl, 2020.
Colas, C., Karch, T., Sigaud, O., and Oudeyer, P.-Y. Autotelic agents with intrinsically motivated goal conditioned reinforcement learning: a short survey. Journal of Artificial Intelligence Research, 74:1159-1199, 2022.
Copet, J., Kreuk, F., Gat, I., Remez, T., Kant, D., Synnaeve, G., Adi, Y., and Defossez, A. Simple and controllable music generation. arXiv preprint arXiv:2306.05284, 2023.
Cui, Y., Niekum, S., Gupta, A., Kumar, V., and Rajeswaran, A. Can foundation models perform zero-shot task specification for robot manipulation? In Learning for Dynamics and Control Conference, pp. 893-905. PMLR, 2022.
Delmas, G., Weinzaepfel, P., Lucas, T., Moreno-Noguer, F., Rogez, G., PoseScript: Linking 3D Human Poses to Structural Descriptions in Natural Language. 2024.
Du, Y., Konyushkova, K., Denil, M., Raju, A., Landon, J., Hill, F., de Freitas, N., and Cabi, S. Vision-language models as success detectors, 2023.
Dunlap, L., Umino, A., Zhang, H., Yang, J., Gonzalez, J. E., and Darrell, T. Diversify your vision datasets with automatic diffusion-based augmentation. CoRR, abs/2305.16289, 2023.
Fan, L., Wang, G., Jiang, Y., Mandlekar, A., Yang, Y., Zhu, H., Tang, A., Huang, D.-A., Zhu, Y., and Anandkumar, A. Minedojo: Building open-ended embodied agents with internet-scale knowledge, 2022.
Fang, A., Jose, A. M., Jain, A., Schmidt, L., Toshev, A., and Shankar, V. Data filtering networks. arXiv preprint arXiv:2309.17425, 2023.
Fu, J., Singh, A., Ghosh, D., Yang, L., and Levine, S. Variational inverse control with events: A general framework for data-driven reward definition. Advances in neural information processing systems, 31, 2018.
Fu, J., Korattikara, A., Levine, S., and Guadarrama, S. From language to goals: Inverse reinforcement learning for vision-based instruction following, 2019.
Gadre, S. Y., Ilharco, G., Fang, A., Hayase, J., Smyrnis, G., Nguyen, T., Marten, R., Wortsman, M., Ghosh, D., Zhang, J., et al. Datacomp: In search of the next generation of multimodal datasets. arXiv preprint arXiv:2304.14108, 2023.
Gao, J., Hu, K., Xu, G., and Xu, H. Can pre-trained textto-image models generate visual goals for reinforcement learning? 2023.
Harnad, S. The symbol grounding problem. Physica D: Nonlinear Phenomena, 42(1-3):335-346, 1990.
He, K., Zhang, X., Ren, S., and Sun, J. Deep residual learning for image recognition. In IEEE Conference on Computer Vision and Pattern Recognition, pp. 770-778, 2015.
Hendrycks, D. and Gimpel, K. Gaussian error linear units (gelus). arXiv preprint arXiv:1606.08415, 2016.
Hill, F., Mokra, S., Wong, N., and Harley, T. Human instruction-following with deep reinforcement learning via transfer-learning from text. arXiv preprint arXiv:2005.09382, 2020.
Hong, F., Zhang, M., Pan, L., Cai, Z., Yang, L., Lie, Z.: AvatarCLIP: Zero-Shot Text-Driven Generation and Animation of 3D Avatars. 2022.
Hsieh, C.-Y., Zhang, J., Ma, Z., Kembhavi, A., and Krishna, R. Sugarcrepe: Fixing hackable benchmarks for vision language compositionality. arXiv:2306.14610, 2023.
Huang, L., Yu, W., Ma, W., Zhong, W., Feng, Z., Wang, H., Chen, Q., Peng, W., Feng, X., Qin, B., et al. A survey on hallucination in large language models: Principles, taxonomy, challenges, and open questions. arXiv:2311.05232, 2023a.
Huang, W., Abbeel, P., Pathak, D., and Mordatch, I. Language models as zero-shot planners: Extracting actionable knowledge for embodied agents. In International Conference on Machine Learning, pp. 9118-9147, 2022.
Huang, W., Wang, C., Zhang, R., Li, Y., Wu, J., and Fei-Fei, L. Voxposer: Composable 3D value maps for robotic manipulation with language models. arXiv:2307.05973, 2023b.
Ichter, B., Brohan, A., Chebotar, Y., Finn, C., Hausman, K., Herzog, A., Ho, D., Ibarz, J., Irpan, A., Jang, E., Julian, R., Kalashnikov, D., Levine, S., Lu, Y., Parada, C., Rao, K., Sermanet, P., Toshev, A. T., Vanhoucke, V., Xia, F., Xiao, T., Xu, P., Yan, M., Brown, N., Ahn, M., Cortes, O., Sievers, N., Tan, C., Xu, S., Reyes, D., Rettinghouse, J., Quiambao, J., Pastor, P., Luu, L., Lee, K.-H., Kuang, Y., Jesmonth, S., Joshi, N. J., Jeffrey, K., Ruano, R. J., Hsu, J., Gopalakrishnan, K., David, B., Zeng, A., and Fu, C. K. Do as i can, not as i say: Grounding language in robotic affordances. In Liu, K., Kulic, D., and Ichnowski, J. (eds.), Proceedings of The 6th Conference on Robot Learning, vol. 205 of Proceedings of Machine Learning Research, pp. 287-318. PMLR, Dec. 14-18, 2023. URL https://proceedings.mlr.press/v205/ichter23a.html.
Jiang, Y., Gu, S. S., Murphy, K. P., and Finn, C. Language as an abstraction for hierarchical deep reinforcement learning. In Wallach, H., Larochelle, H., Beygelzimer, A., d'Alch'e-Buc, F., Fox, E., and Garnett, R. (eds.), Advances in Neural Information Processing Systems, vol. 32. Curran Associates, Inc., 2019. URL https://proceedings.neurips.cc/paper_files/paper/2019/file/0af787945872196b42c9f73ead2565 c8-Paper.pdf.
Kato, H., Beker, D., Morariu, M., Ando, T., Matsuoka, T., Kehl, W., and Gaidon, A. Differentiable rendering: A survey. arXiv:2006.12057, 2020.
Kingma, D. P. and Ba, J. Adam: A method for stochastic optimization. arXiv:1412.6980, 2014.

(56) References Cited

OTHER PUBLICATIONS

Liu, M., Zhu, M., and Zhang, W. Goal-conditioned reinforcement learning: Problems and solutions. arXiv:2201.08299, 2022.
Lewis, M., Nayak, N. V., Yu, P., Yu, Q., Merullo, J., Bach, S. H., and Pavlick, E. Does CLIP bind concepts? Probing compositionality in large image models. arXiv:2212.10537, 2022.
Loshchilov, I. and Hutter, F. Decoupled weight decay regularization. arXiv preprint arXiv:1711.05101, 2017.
Lynch, C. and Sermanet, P. Language conditioned imitation learning over unstructured data, 2021.
Ma, Y. J., Liang, W., Wang, G., Huang, D .- A., Bastani, O., Jayaraman, D., Zhu, Y., Fan, L., and Anandkumar, A. Eureka: Human-level reward design via coding large language models. arXiv preprint arXiv:2310.12931, 2023.
Mahmoudieh, P., Pathak, D., and Darrell, T. Zeroshot reward specification via grounded natural language. In Chaudhuri, K., Jegelka, S., Song, L., Szepesvari, C., Niu, G., and Sabato, S. (eds.), Proceedings of the 39th International Conference on Machine Learning, vol. 162 of Proceedings of Machine Learning Research, pp. 14743-14752. PMLR, Jul. 17-23, 2022. URL https://proceedings.mlr.press/v162/mahmoudieh22a.html.
Nair, S., Mitchell, E., Chen, K., ichter, b., Savarese, S., and Finn, C. Learning language-conditioned robot behavior from offline data and crowd-sourced annotation. In Conference on Robot Learning, 2021.
Neider, J., Davis, T., and Woo, M. OpenGL programming guide, vol. 478. Addison-Wesley Reading, MA, 1993.
Pardo, F., Tavakoli, A., Levdik, V., and Kormushev, P. Time limits in reinforcement learning. In International Conference on Machine Learning, pp. 4045-4054. PMLR, 2018.
Penedo, G., Malartic, Q., Hesslow, D., Cojocaru, R., Cappelli, A., Alobeidli, H., Pannier, B., Almazrouei, E., and Launay, J. The refinedweb dataset for falcon llm: outperforming curated corpora with web data, and web data only. arXiv preprint arXiv:2306.01116, 2023.
Perez, J., Proux, D., Roux, C., and Niemaz, M. Larg, language-based automatic reward and goal generation, 2023. URL https://arxiv.org/pdf/2306.10985.pdf.
Plappert, M., Sampedro, R., Xu, T., Akkaya, I., Kosaraju, V., Welinder, P., D'Sa, R., Petron, A., de Oliveira Pinto, H. P., Paino, A., Noh, H., Weng, L., Yuan, Q., Chu, C., and Zaremba, W. Asymmetric self-play for automatic goal discovery in robotic manipulation. arXiv:2101.04882, 2021.
Radenovic, F., Dubey, A., Kadian, A., Mihaylov, T., Vandenhende, S., Patel, Y., Wen, Y., Ramanathan, V., and Mahajan, D. Filtering, distillation, and hard negatives for vision-language pre-training. In IEEE Conference on Computer Vision and Pattern Recognition, 2023.
Perez, J., Proux, D., Roux, C., and Niemaz, M. Larg, language-based automatic reward and goal generation, 2023. URL https://arxiv.org/pdf/2306.10985.pdf.<https://arxiv.org/pdf/2306.10985.pdf>.
Radford, A., Kim, J. W., Hallacy, C., Ramesh, A., Goh, G., Agarwal, S., Sastry, G., Askell, A., Mishkin, P., Clark, J., et al. Learning transferable visual models from natural language supervision. In International conference on machine learning, pp. 8748-8763. PMLR, 2021.
Raffel, C., Shazeer, N., Roberts, A., Lee, K., Narang, S., Matena, M., Zhou, Y., Li, W., and Liu, P. J. Exploring the limits of transfer learning with a unified text-to-text transformer. The Journal of Machine Learning Research, 21(1):5485-5551, 2020.
Raman, V., Lignos, C., Finucane, C., Lee, K. C. T., Marcus, M. P., and Kress-Gazit, H. Sorry dave, i'm afraid I can't do that: Explaining unachievable robot tasks using natural language. In Robotics: Science and Systems IX, Technische Universitat Berlin, Berlin, Germany, Jun. 24-Jun. 28, 2013, 2013.
Ramesh, A., Pavlov, M., Goh, G., Gray, S., Voss, C., Radford, A., Chen, M., and Sutskever, I. Zero-shot textto-image generation. In International Conference on Machine Learning, pp. 8821-8831. PMLR, 2021.
Ramesh, A., Dhariwal, P., Nichol, A., Chu, C., and Chen, M. Hierarchical text-conditional image generation with clip latents. arXiv preprint arXiv:2204.06125, 1(2):3, 2022.
Rocamonde, J., Montesinos, V., Nava, E., Perez, E., and Lindner, D. Vision-language models are zero-shot reward models for reinforcement learning. arXiv preprint arXiv:2310.12921, 2023.
Rombach, R., Blattmann, A., Lorenz, D., Esser, P., and Ommer, B. High-resolution image synthesis with latent diffusion models. In Proceedings of the IEEE/CVF conference on computer vision and pattern recognition, pp. 10684-10695, 2022.
Schuhmann, C., Beaumont, R., Vencu, R., Gordon, C., Wightman, R., Cherti, M., Coombes, T., Katta, A., Mullis, C., Wortsman, M., et al. Laion-5b: An open large-scale dataset for training next generation image-text models. Advances in Neural Information Processing Systems, 35: 25278-25294, 2022.
Schulman, J., Wolski, F., Dhariwal, P., Radford, A., and Klimov, O. Proximal policy optimization algorithms. arXiv preprint arXiv:1707.06347, 2017.
Singer, U., Polyak, A., Hayes, T., Yin, X., An, J., Zhang, S., Hu, Q., Yang, H., Ashual, O., Gafni, O., et al. Make-avideo: Text-to-video generation without text-video data. arXiv preprint arXiv:2209.14792, 2022.
Stepputtis, S., Campbell, J., Phielipp, M., Lee, S., Baral, C., and Ben Amor, H. Language-conditioned imitation learning for robot manipulation tasks. In Larochelle, H., Ranzato, M., Hadsell, R., Balcan, M., and Lin, H. (eds.), Advances in Neural Information Processing Systems, vol. 33, pp. 13139-13150. Curran Associates, Inc., 2020. URL.
Stooke, A., Mahajan, A., Barros, C., Deck, C., Bauer, J., Sygnowski, J., Trebacz, M., Jaderberg, M., Mathieu, M., et al. Open-ended learning leads to generally capable agents. arXiv:2107.12808, 2021.
Sun, Q., Fang, Y., Wu, L., Wang, X., and Cao, Y. Evaclip: Improved training techniques for clip at scale. arXiv preprint arXiv:2303.15389, 2023.
Tam, A., Rabinowitz, N., Lampinen, A., Roy, N. A., Chan, S., Strouse, D., Wang, J., Banino, A., and Hill, F. Semantic exploration from language abstractions and pretrained representations. In Koyejo, S., Mohamed, S., Agarwal, A., Belgrave, D., Cho, K., and Oh, A. (eds.), Advances in Neural Information Processing Systems, vol. 35, pp. 25377-25389. Curran Associates, Inc., 2023.
Tassa, Y., Doron, Y., Muldal, A., Erez, T., Li, Y., Casas, D. d. L., Budden, D., Abdolmaleki, A., Merel, J., Lefrancq, A., et al. DeepMind Control Suite. arXiv:1801.00690, 2018.
Todorov, E., Erez, T., and Tassa, Y. Mujoco: A physics engine for model-based control. In 2012 IEEE/RSJ international conference on intelligent robots and systems, pp. 5026-5033. IEEE, 2012.
Touvron, H., Martin, L., Stone, K., Albert, P., Almahairi, A., Babaei, Y., Bashlykov, N., Batra, S., Bhargava, P., Bhosale, S., Bikel, D., Blecher, L., Canton-Ferrer, C., Chen, M., Cucurull, G., Esiobu, D., Fernandes, J., Fu, J., Fu, W., Fuller, B., Gao, C., Goswami, V., Goyal, N., Hartshorn, A., Hosseini, S., Hou, R., Inan, H., Kardas, M., Kerkez, V., Khabsa, M., Kloumann, I., Korenev, A., Koura, P. S., Lachaux, M., Lavril, T., Lee, J., Liskovich, D., Lu, Y., Mao, Y., Martinet, X., Mihaylov, T., Mishra, P., Molybog, I., Nie, Y., Poulton, A., Reizenstein, J., Rungta, R., Saladi, K., Schelten, A., Silva, R., Smith, E. M., Subramanian, R., Tan, X. E., Tang, B., Taylor, R., Williams, A., Kuan, J. X., Xu, P., Yan, Z., Zarov, I., Zhang, Y., Fan, A., Kambadur, M., Narang, S., Rodriguez, A., Stojnic, R., Edunov, S., and Scialom, T. Llama 2: Open foundation and fine-tuned chat models. arXiv:2307.09288, 2023.
Tschannen, M., Kumar, M., Steiner, A., Zhai, X., Houlsby, N., and Beyer, L. Image captioners are scalable vision learners too. arXiv:2306.07915, 2023.
Xu, H., Xie, S., Tan, X. E., Huang, P.-Y., Howes, R., Sharma, V., Li, S.-W., Ghosh, G., Zettlemoyer, L., and Feichtenhofer, C. Demystifying clip data. arXiv:2309.16671, 2023.
Yu, T., Quillen, D., He, Z., Julian, R., Hausman, K., Finn, C., and Levine, S. Meta-world: A benchmark and evaluation for multi-task and meta reinforcement learning. In Conference on robot learning, pp. 1094-1100. PMLR, 2020.

(56) References Cited

OTHER PUBLICATIONS

Yu, W., Gileadi, N., Fu, C., Kirmani, S., Lee, K.-H., Arenas, M. G., Chiang, H.-T. L., Erez, T., Hasenclever, L., Humplik, J., et al. Language to rewards for robotic skill synthesis. arXiv preprint arXiv:2306.08647, 2023.
Yuksekgonul, M., Bianchi, F., Kalluri, P., Jurafsky, D., and Zou, J. When and why vision-language models behave like bags-of-words, and what to do about it? In The Eleventh International Conference on Learning Representations, 2022.
Zeltner, T., Rousselle, F., Weidlich, A., Clarberg, P., Nov'ak, J., Bitterli, B., Evans, A., Davidovic, T., Kallweit, S., and Lefohn, A. Real-time neural appearance models. arXiv preprint arXiv:2305.02678, 2023.
Zeng, A., Attarian, M., Ichter, B., Choromanski, K., Wong, A., Welker, S., Tombari, F., Purohit, A., Ryoo, M., Sindhwani, V., et al. Socratic models: Composing zero-shot multimodal reasoning with language. arXiv:2204.00598, 2022.
Zhai, X., Mustafa, B., Kolesnikov, A., and Beyer, L. Sigmoid loss for language image pre-training. arXiv preprint arXiv:2303.15343, 2023.
Zhang, L., Rao, A., and Agrawala, M. Adding conditional control to text-to-image diffusion models. In Proceedings of the IEEE/CVF International Conference on Computer Vision, pp. 3836-3847, 2023.
Zhou, H., Yao, X., Meng, Y., Sun, S., Blng, Z., Huang, K., and Knoll, A. Language-conditioned learning for robotic manipulation: A survey. arXiv preprint arXiv:2312.10807, 2023.
Zhou, L. and Small, K. Inverse reinforcement learning with natural language goals. In Proceedings of the AAAI Conference on Artificial Intelligence, vol. 35, pp. 11116-11124, May 2020. doi: 10.1609/aaai.v35i12.17326.

* cited by examiner

BRIDGING LANGUAGE AND ENVIRONMENTS WITH RENDERING FUNCTIONS AND VISION-LANGUAGE MODELS

FIELD

The present disclosure relates to robot systems and more particularly to vision language models (VLMs).

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are one type of robot and are an example of an autonomous system that is mobile and may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants/humans from a pickup to a destination. Another example of a navigating robot is a robot used to perform one or more functions inside a residential space (e.g., a home).

Other types of robots are also available, such as residential robots configured to perform various domestic tasks, such as putting liquid in a cup, filling a coffee machine, etc.

SUMMARY

In a feature, a robot system includes: image encodings generated based on renderings of configurations, respectively of a robot, the configurations including at least a predetermined number of different poses of the robot in an environment; an encoding module configured to receive text descriptive of an action to be performed by the robot and to encode the text into a text encoding; a scoring module configured to generate scores for the configurations based on comparisons of (a) the text encoding with (b) the image encoding of the respective configuration; a selection module configured to select k of the configurations based on the scores, where k is an integer greater than or equal to 1; and an actuation module configured to actuate the robot based on the selected k of the configurations based on actuating the robot to achieve the action described in the text.

In further features, the scoring module is configured to generate the scores using cosine similarity.

In further features, the selection module is configured to select k of the configurations with the k highest scores.

In further features, the renderings include at least two different renderings of each configuration from different points of view.

In further features, the different points of view are on a same horizontal plane.

In further features, a vision-language model (VLM) module and a projection module are configured to finetune the selected k of the configurations, where the actuation module is configured to actuate the robot based on the k finetuned selected configurations.

In further features, the projection module is configured to finetune the selected k configurations based on one of gradient ascent and projected gradient ascent.

In further features, the scoring module is configured to generate a score for one of the configurations based on (a) a first score for the one of the configurations generated based on a first comparison of the text encoding with a first image encoding of the one of the configurations generated based on a first point of view and (b) a second score for the one of the configurations generated based on a second comparison of the text encoding with a second image encoding of the one of the configurations generated based on a second point of view that is different than the first point of view.

In further features, the scoring module is configured to generate the score for the one of the configurations based on an average of the first score and the second score.

In further features, the encoding module is configured to encode the text using a vision-language model (VLM) text encoding algorithm.

In further features, the encoding module includes a neural network configured to encode the text.

In further features, each of the configurations includes three-dimensional coordinates of a portion of the robot in the environment.

In further features, each of the configurations includes angles of a joint of the robot in the environment.

In further features, each of the configurations includes three-dimensional coordinates of an object to be acted upon by the robot in the environment.

In further features, each of the configurations includes at least one dimension describing the orientation of an object to be acted upon by the robot in the environment.

In further features, the image encodings are generated using a vision-language model (VLM) image encoding algorithm based on the renderings of configurations.

In further features, the renderings are generated using the MuJoCo rendering algorithm.

In a feature, a training system includes: the robot system; a rendering module configured to generate the renderings based on the configurations, respectively; and a second encoding module configured to encode the renderings into the image encodings, respectively.

In a feature, a robot system includes: image encodings generated based on renderings of configurations, respectively of a robot, the configurations including at least a predetermined number of different poses of the robot in an environment; an encoding module configured to receive text descriptive of an action to be performed by the robot and to encode the text into a text encoding; a scoring module configured to generate scores for the configurations based on comparisons of (a) the text encoding with (b) the image encoding of the respective configuration; a selection module configured to select k of the configurations based on the scores, where k is an integer greater than or equal to 1; and an actuation module configured to actuate the robot based on a dot product of the k image encodings of the selected k of the configurations and actuating the robot to achieve the action described in the text.

In a feature, a method includes: receiving image encodings generated based on renderings of configurations, respectively of a robot, the configurations including at least a predetermined number of different poses of the robot in an environment; receiving text descriptive of an action to be performed by the robot and to encode the text into a text encoding; generating scores for the configurations based on comparisons of (a) the text encoding with (b) the image encoding of the respective configuration; selecting k of the configurations based on the scores, where k is an integer greater than or equal to 1; and actuating the robot based on the selected k of the configurations based on actuating the robot to achieve the action described in the text.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
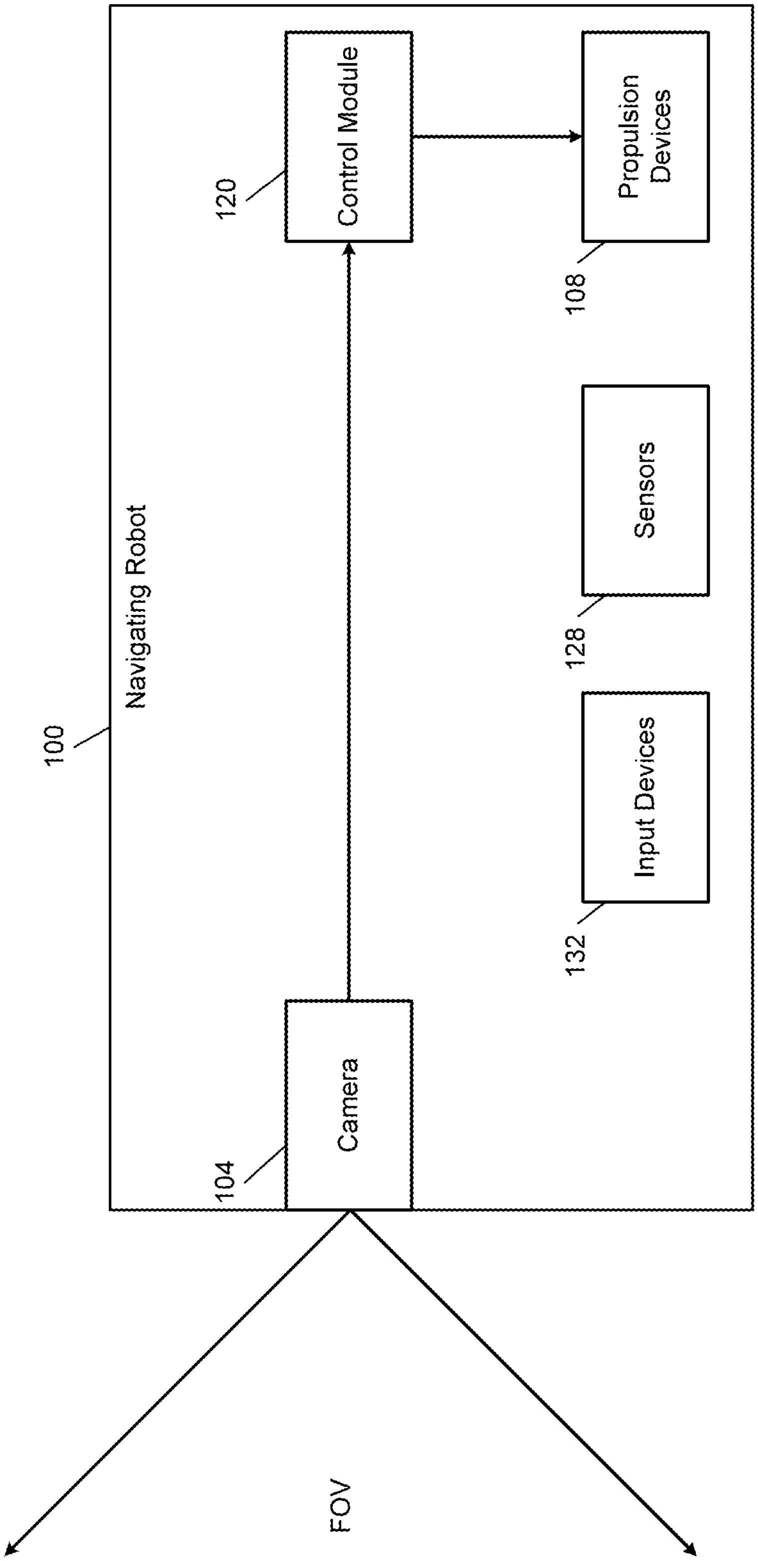
FIGS. 1 and 2 are functional block diagrams of example robots.

A robot may include a camera. Images from the camera and measurements from other sensors of the robot can be used to control actuation of the robot, such as propulsion, actuation of one or more arms, and/or actuation of a gripper.

Vision-language models (VLMs) have potential for grounding language, and thus enabling language-conditioned agents (LCAs) to perform diverse tasks specified with text. LCAs may be trained based on reinforcement learning (RL) with rewards given by VLMs. If single-task RL is employed, there may be a large cost of evaluating the VLM many times, to train a policy for each new task.

Multi-task RL (MTRL) could be used, but MTRL does not always generalize reliably to new tasks. The present application involves using a MTRL approach involving: first a configuration of the environment that has a high VLM score for text describing a task is found; then goal-conditioned reinforcement learning (GCRL) is used to reach that configuration. Enhancements to the quality and speed of VLM-based LCAs, including the retrieval and finetuning of configurations from diverse configuration datasets, the use of distilled models, and the evaluation of VLMs from multiple viewpoints may be used to resolve the ambiguities inherent in a single 2D view. This produces LCAs that act on text in real-time, and excel at a wide range of previously unseen tasks, without requiring any textual task descriptions or other forms of environment-specific annotation during training.

The systems and methods described herein involve building LCAs by combining VLM-based text-to-goal generation with goal-reaching. A configuration of the environment that has a high VLM score for a given text is determined; then a goal-conditioned reinforcement learning (GCRL) agent is used to reach that configuration.

The present application has several advantages over other approaches to building LCAs based on MTRL. For example, a dataset of diverse configurations can be used to train the GCRL agent, circumventing the problem of choosing a corpus of texts to train MTRL. A reward function for GCRL is typically less oscillatory and faster to evaluate than the VLM score that could be used to train MTRL.

Multiple viewpoints may be used to mitigate problems of occlusion and distance ambiguity inherent in a single 2D view (image). A large dataset of diverse configurations with precomputed VLM embeddings (encodings) may be used for training, such as for rapid retrieval of configurations corresponding to a given text. These datasets may be used to train distilled models for rapid evaluation of VLM scores, accelerating both text-to-goal generation and the training of MTRL agents. The derivatives of such distilled models with respect to configuration are better behaved than those of the original VLM score, and are well-suited to the finetuning of retrieved configurations.

Systems and methods described herein attain higher returns than other MTRL baselines, including when performing zero-shot command execution, for many different tasks. Use of the distilled model reduces computation time of VLM-based rewards by up to 20,000 times while remaining sufficiently accurate that finetuning configurations using the distilled model increases the true VLM score.

An approach to grounding is to obtain textual annotations for an environment. For instance, state descriptions may be used to learn language-conditioned goal generators and language-conditioned reward functions. Descriptions of trajectories (state sequences or state-action sequences), can be coupled with imitation learning or with inverse reinforcement learning to create language-conditioned agents. To reduce the cost of collecting human annotations, annotations may be generated algorithmically. Another way to circumvent costly human annotation is to use foundation models. For example, large language models (LLMs) may be used to write source code that computes reward functions or goal states from textual descriptions. LLMs may be used to select and orchestrate predefined skills to complete tasks defined with natural language. LLMs may use task- and environment-specific prompting, which may involve user input; and may involve hallucination.

Vision-language models (VLMs) may be used to ground language. For example, VLMs can be used to derive reward functions from natural language, such as to pretrain language-conditioned policies, to derive extrinsic reward functions for exploration, and as task-completion detectors. The reward functions resulting from VLMs however may be costly to evaluate and they may be oscillatory ('noisy'), which may lead to slow and unreliable RL.

The present application uses VLMs, but these difficulties are avoided by using the VLM to find configurations with a high VLM score.

Text-to-goal inference identifies sets of states that align with a given textual description. These states may be fed to goal-conditioned policies or used to construct hybrid controllers and thus to create LCAs. Text-to-text, text-to-image, text-to-audio, and text-to-video models may be used with foundation models for text-to-goal procedures. Generating images that correspond to a given environment and instruction is challenging. Additional processing may be used to derive rewards or goal states from the resulting images. Such additional functions may be computationally costly or error prone.

In contrast, the present application directly generates goal configurations, eliminating the need for image editing, and for such extra processing. The present application addresses the problem of finding a language-conditioned policy: given text describing a (previously unseen) task to be performed in an environment, the policy should result in configurations of that environment that correspond well visually to the given text. The present application involves two subproblems: finding configurations of the environment with high VLM scores for a given text; and designing a goal-conditioned policy to reach such configurations.

FIG. 1 is a functional block diagram of an example implementation of a navigating robot 100. The navigating robot 100 is a vehicle and is mobile. The navigating robot 100 includes a camera 104 that captures images within a predetermined field of view (FOV). The predetermined FOV may be less than or equal to 360 degrees around the navigating robot 100. The operating environment of the navigating robot 100 may be an indoor space (e.g., a building), an outdoor space, or both indoor and outdoor spaces. In various implementations, the camera 104 may be a binocular camera, or two or more cameras may be included in the navigating robot 100.

The camera 104 may be, for example, a grayscale camera, a red, green, blue (RGB) camera, or another suitable type of camera. The camera 104 may or may not capture depth (D) information, such as in the example of a grayscale-D camera or a RGB-D camera. The camera 104 may be fixed to the navigating robot 100 such that the orientation of the camera 104 (and the FOV) relative to the navigating robot 100 remains constant. The camera 104 may update (capture images) at a predetermined frequency, such as 60 hertz (Hz), 120 Hz, or another suitable frequency.

The navigating robot 100 may include one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly. The navigating robot 100 is powered, such as via an internal battery and/or via an external power source, such as wirelessly (e.g., inductively).

While the example of a navigating robot is provided, the present application is also applicable to other types of robots with a camera.

Figure 2:
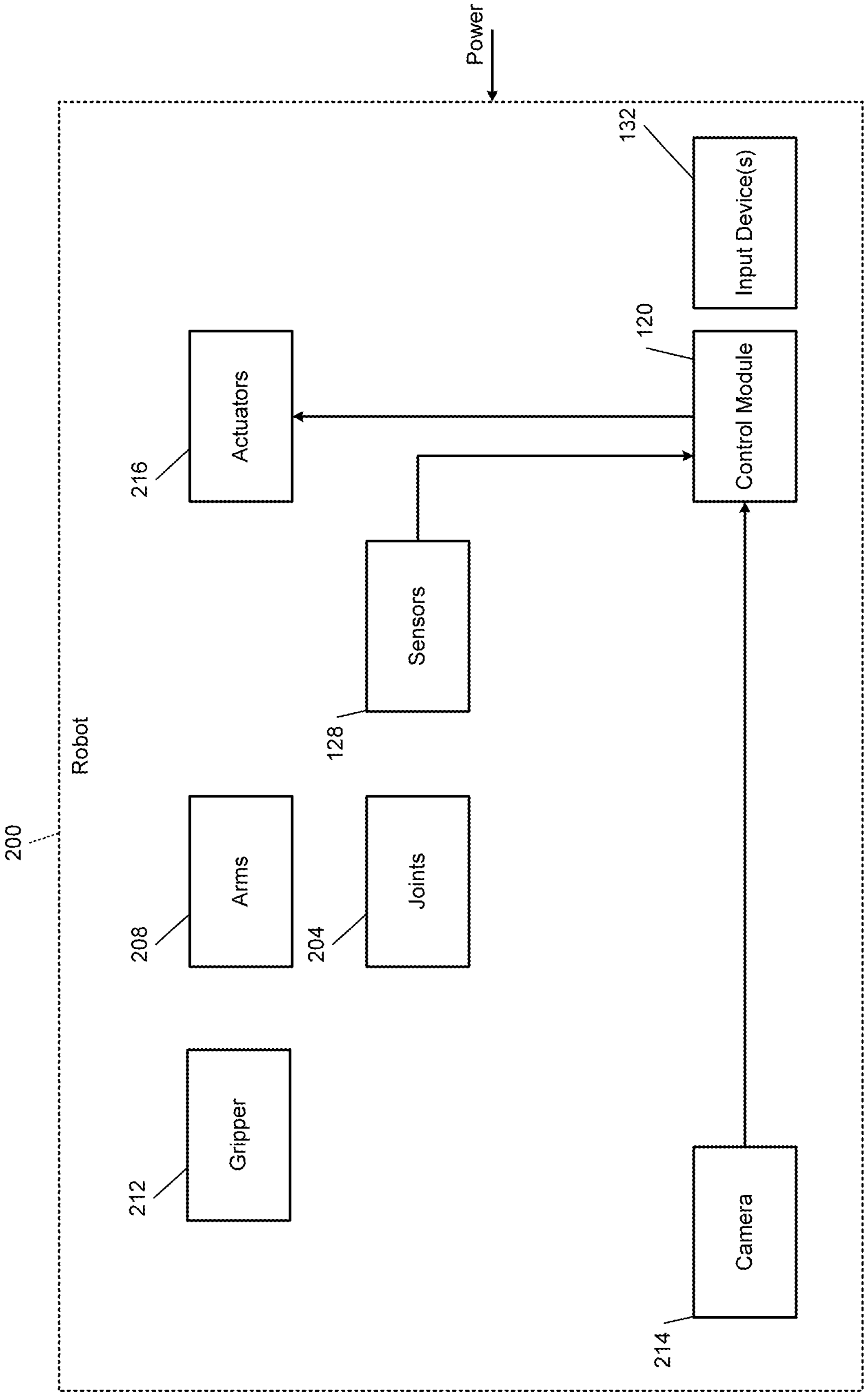

For example, FIG. 2 includes a functional block diagram of an example robot 200. The robot 200 may be stationary or mobile. The robot 200 may be, for example, a 5 degree-of-freedom (DoF) robot, a 6 DoF robot, a 7 DoF robot, an 8 DoF robot, or have another number of degrees of freedom. In various implementations, the robot 200 may include the Panda Robotic Arm by Franka Emika, the mini cheetah robot, or another suitable type of robot. The robot 200 may be a humanoid robot in various implementations.

The robot 200 is electrically powered, such as via an internal battery and/or via an external power source, such as alternating current (AC) power. AC power may be received via an outlet, a direct cabled connection, etc. In various implementations, the robot 200 may receive power wirelessly, such as inductively.

The robot 200 includes a plurality of joints 204 and arms 208. Each arm may be connected between two joints. Each joint may introduce a degree of freedom of movement of a (multi-fingered) gripper 212 of the robot 200. The robot 200 includes actuators 216 that actuate the arms 208 and the gripper 212. The actuators 216 may include, for example, electric motors and other types of actuation devices.

In the example of FIG. 1, a control module 120 controls actuation of the propulsion devices 108. In the example of FIG. 2, the control module 120 controls the actuators 216 and therefore the actuation (movement, articulation, actuation of the gripper 212, etc.) of the robot 200. The control module 120 may include a planner module configured to plan movement of the robot 200 to perform one or more different tasks. An example of a task includes moving to and grasping and moving an object. The present application, however, is also applicable to other tasks, such as navigating from a first location to a second location while avoiding objects and other tasks. The control module 120 may, for example, control the application of power to the actuators 216 to control actuation and movement. Actuation of the actuators 216, actuation of the gripper 212, and actuation of the propulsion devices 108 will generally be referred to as actuation of the robot.

The robot 200 also includes a camera 214 that captures images within a predetermined field of view (FOV). The predetermined FOV may be less than or equal to 360 degrees around the robot 200. The operating environment of the robot 200 may be an indoor space (e.g., a building), an outdoor space, or both indoor and outdoor spaces.

The camera 214 may be, for example, a grayscale camera, a red, green, blue (RGB) camera, or another suitable type of camera. The camera 214 may or may not capture depth (D) information, such as in the example of a grayscale-D camera or a RGB-D camera. The camera 214 may be fixed to the robot 200 such that the orientation of the camera 214 (and the FOV) relative to the robot 200 remains constant. The camera 214 may update (capture images) at a predetermined frequency, such as 60 hertz (Hz), 120 Hz, or another suitable frequency. In various implementations, the camera 214 may be a binocular camera, or two or more cameras may be included in the robot 200.

The control module 120 controls actuation of the robot based on one or more images from the camera. The control module 120 may control actuation additionally or alternatively based on measurements from one or more sensors 128 and/or one or more input devices 132. Examples of sensors include position sensors, temperature sensors, location sensors, light sensors, rain sensors, force sensors, torque sensors, etc. Examples of input devices include touchscreen displays, joysticks, trackballs, pointer devices (e.g., mouse), keyboards, steering wheels, pedals, a microphone, and/or one or more other suitable types of input devices.

For example, text describing a task may be input. The control module 120 may control actuation of the robot to perform the task as discussed further below.

Figure 3:
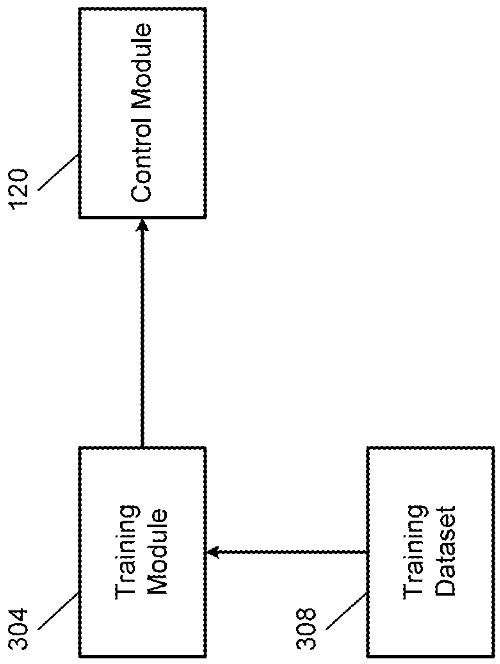
FIG. 3 includes a functional block diagram of an example training system.

FIG. 3 is a functional block diagram of an example training system. A training module 304 trains the control module 120 using a training dataset 308. The training dataset 308 and the training is discussed further below.

Figure 4:
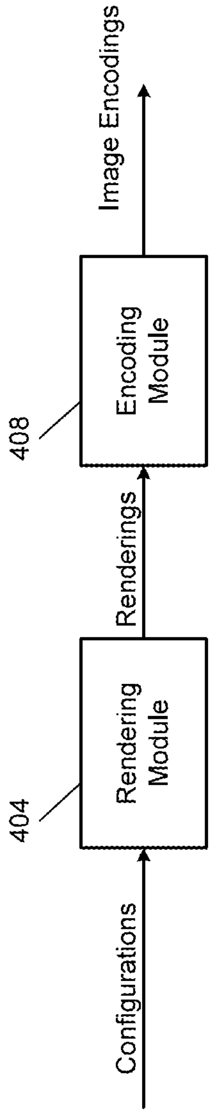
FIG. 4 is a functional block diagram of an example portion of the training system.
Figure 5:
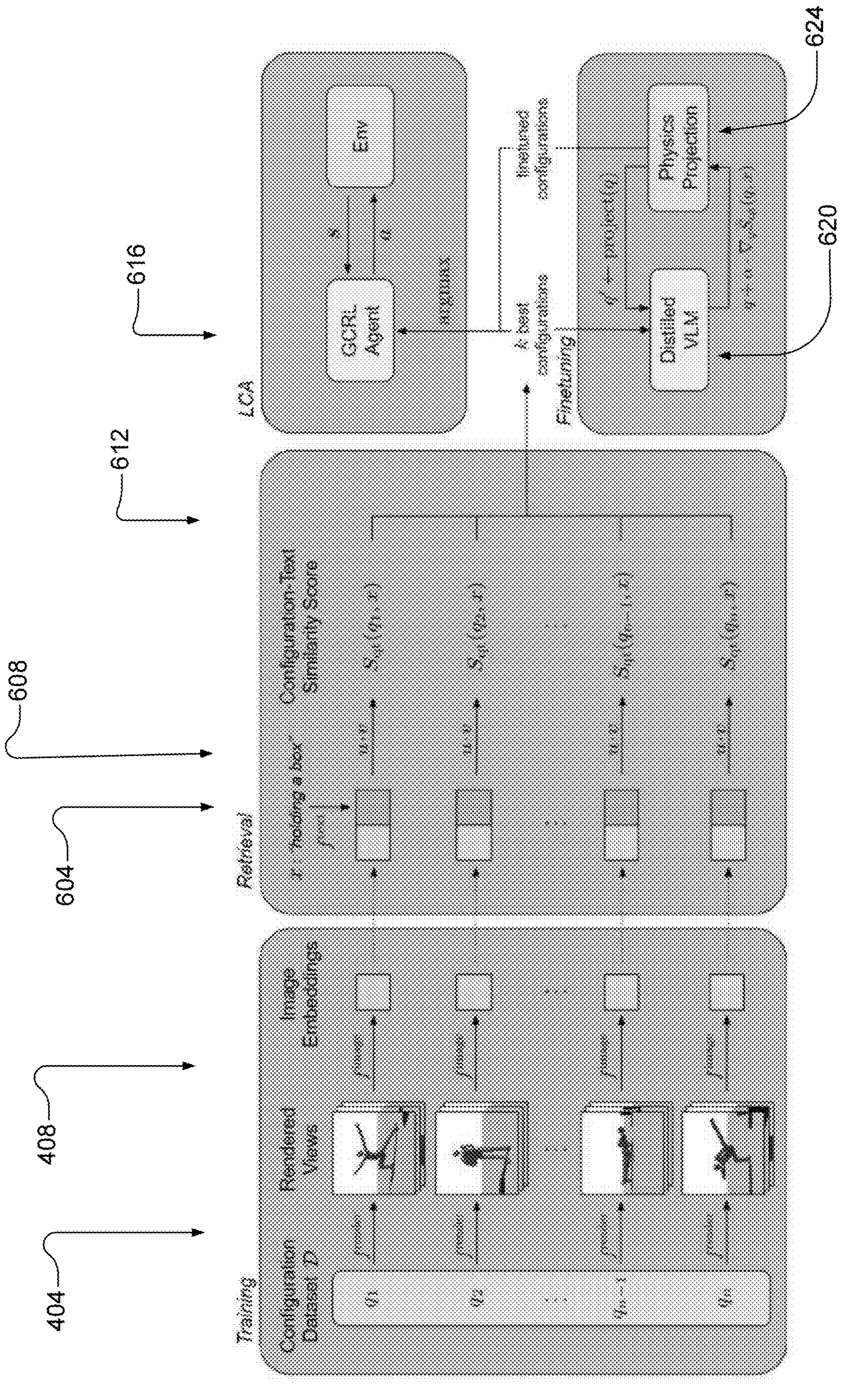
FIG. 5 includes examples of configurations and renderings.

FIG. 4 is a functional block diagram of an example portion of the training system. A rendering module 404 renders images of robots (e.g., humanoid robots) in a configuration q, using an image rendering algorithm. Examples of configurations and renderings are illustrated in the example of FIG. 5. A configuration may include joint angles and Cartesian coordinates of a robot and objects in a space (environment). To build a collection of configurations that includes a configuration that will correspond well to a given textual instruction, the collection of configurations may be diverse and include many, such as at least 10,000 configurations (e.g., a predetermined number). The robot can be actuated to achieve the poses illustrated in the renderings. The robot may have the general animal form as the animal in the images. For example, the robot may be a humanoid robot in the example of the images including humans.

The configurations are stored in the training dataset 308. The rendering module 404 may generate two or more different renderings for each configuration from two or more different points of view, respectively. Renderings of a configuration from different points of view are illustrated in FIG. 5.

An example of the components of a configuration is as follows.

| Configuration Dimension | Description |
|---|---|
| 0 | z-coordinate of the torso (centre) |
| 1 | x-orientation of the torso (centre) |
| 2 | y-orientation of the torso (centre) |
| 3 | z-orientation of the torso (centre) |
| 4 | w-orientation of the torso (centre) |
| 5 | z-angle of the abdomen (in lower waist) |
| 6 | y-angle of the abdomen (in lower waist) |
| 7 | x-angle of the abdomen (in pelvis) |
| 8 | x-coordinate of angle between pelvis and right hip (in right thigh) |
| 9 | z-coordinate of angle between pelvis and right hip (in right thigh) |
| 10 | y-coordinate of angle between pelvis and right hi (in right thigh) |
| 11 | angle between right hip and the right shin (in right knee) |
| 12 | x-coordinate of angle between pelvis and left hip (in left thigh) |
| 13 | z-coordinate of angle between pelvis and left hip (in left thigh) |
| 14 | y-coordinate of angle between pelvis and left hip (in left thigh) |
| 15 | angle between left hip and the left shin (in left knee) |
| 16 | coordinate-1 (multi-axis) angle between torso |
| 17 | and right arm (in right upper arm) |
| 18 | coordinate-2 (multi-axis) angle between torso |
| 19 | and right arm (in right upper arm) |
| 20 | angle between right upper arm and right lower arm (in right elbow) |
| 21 | coordinate-1 (multi-axis) angle between torso and left arm (in left upper arm) |
| 22 | coordinate-2 (multi-axis) angle between torso and left arm (in left upper arm) |
| 23 | angle between left upper arm and left lower arm (in left elbow) |
| 24 | angle between left shin and left ankle |
| 25 | angle between right sin and right ankle |
| 26 | x-coordinate of the cube |
| 27 | y-coordinate of the cube |
| 28 | z-coordinate of the cube |
| 29 | x-orientation of the cube |
| 30 | y-orientation of the cube |
| | z-orientation of the cube |
| | w-orientation of the cube |

An encoding module 408 encodes (embeds) the renderings into image encodings (embeddings), respectively, using an encoding/embedding algorithm. The encoding/embedding algorithm may be, for example, a VLM image encoding algorithm or another suitable type of encoding/embedding algorithm. The encodings may be, for example, vector or matrix representations indicative of the configurations, respectively, of the robot in the space. The encodings of the renderings are stored for later use by the control module 120 and used to determine how to actuate the robot to perform a task specified by a given text. The encoding module 408 may for example include a neural network.

At runtime of the robot, text descriptive of a task to be performed is input and received by the control module 120. In the example of FIG. 5, the text "holding a box" is input for the task to be performed by the robot of holding a box that is in the environment of the robot. While the example of manipulating a box (e.g., cube) is provided, the present application is also applicable to other types and shapes of objects.

Figure 6:
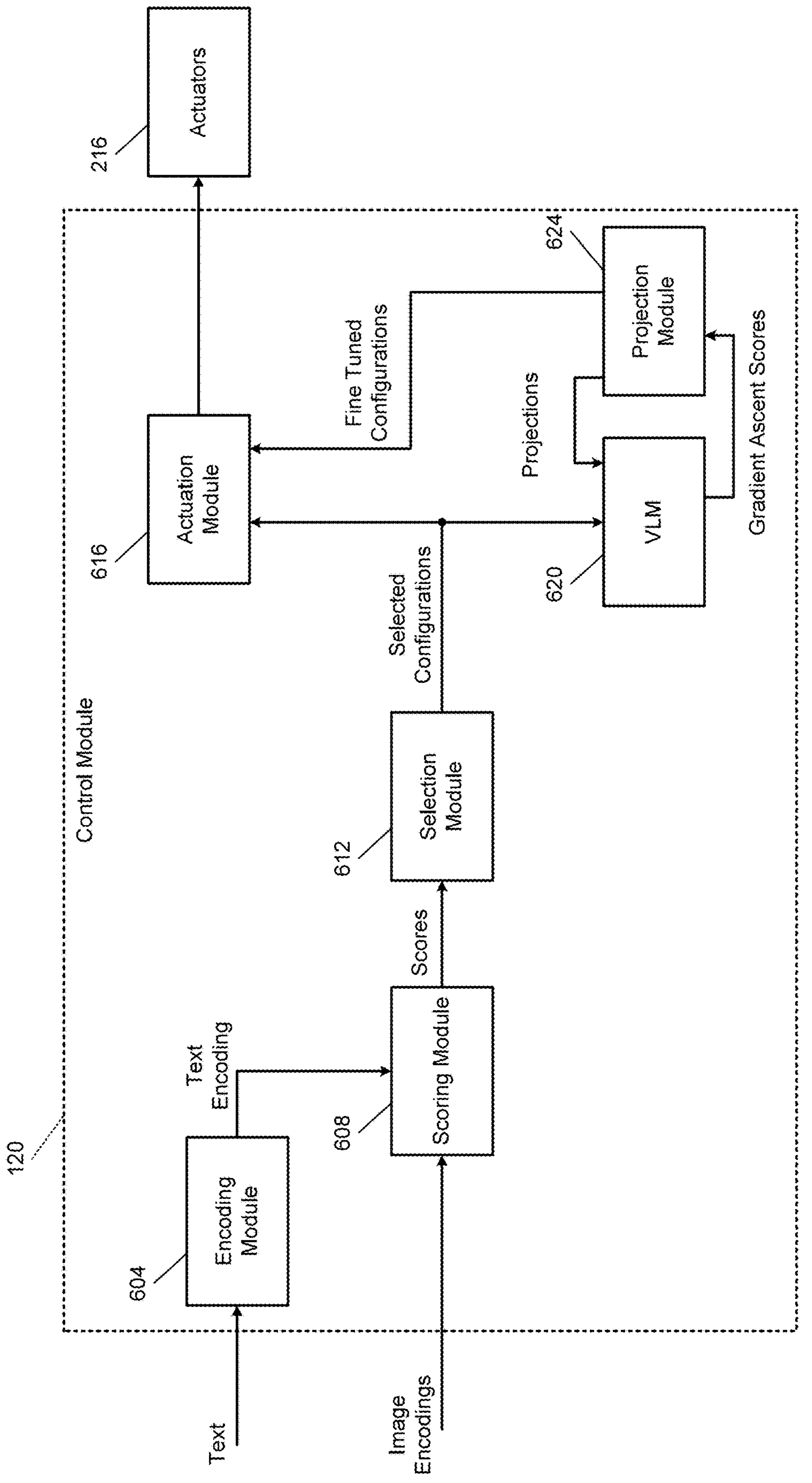
FIG. 6 is a functional block diagram of an example implementation of a control system of the robot.

FIG. 6 is a functional block diagram of an example implementation of a control system of the robot. The modules of FIG. 6 may be implemented within the control module 120.

An encoding module 604 encodes (embeds) the text descriptive of the task to be performed using an encoding/embedding algorithm. The encoding/embedding algorithm may be, for example, a VLM text encoding algorithm or another suitable algorithm. The encodings may be, for example, vector or matrix representations. The encoding of the text is in the same domain as the encodings of the renderings so the encoding of the text can be compared with the encodings of the renderings to determine similarity. In various implementations, the encoding module 604 may include a neural network.

A scoring module 608 determines a score for a rendering (or configuration) based on a comparison of the encoding of the rendering and the encoding of the text. The score reflects a similarity between the encoding of the rendering and the encoding of the text. The scoring module 608 may, for example, increase as the score as the similarity increases and vice versa. The scoring module 608 does this for each of the renderings producing a score for each of the renderings that reflects the similarity between that rendering and the text for the task to be performed. The scoring module 608 may determine the scores, for example, using cosine similarities (dot products) between two encodings (text and rendering).

A selection module 612 selects k of the renderings based on the scores of the renderings, respectively, where k is an integer greater than or equal to 1. The selection module 612 may select, for example, the k renderings with the k highest scores. This corresponds to the best k configurations for the robot to perform the task described by the text.

An actuation module 616 actuates the actuators (e.g., 216) of the robot based on the k configurations corresponding to the renderings with the k highest scores. This actuates the robot based on the corresponding k configurations to perform the task described by the text. The actuation module 616 may include, for example, a goal conditioned reinforcement learning (GCRL) agent or another suitable type of model to determine actions (a) to perform by the robot in the environment (Env) based on the k configurations and states s of the environment.

In various implementations, the actuation module 616 may actuate the actuators based on one or more finetuned configurations. A VLM module 620 and a projection module 624 may be used to determine the finetuned configuration(s) based on the k selected configurations/renderings. The VLM module 620 may, for example, determine scores (e.g., on which gradient ascent may be performed) for the k selected configurations. The projection module may determine projections of the configurations, so as to ensure constraints (e.g., unilateral constraints representing the requirement that objects of the environment do not interpenetrate or joint-angle constraints) are satisfied.

Generally speaking, configurations may be selected using renderings and VLMs. The environment may be modeled as a controlled Markov process $$M = (S, A, \rho, \hat{P}),$$

with state space S, action space A, initial state distribution p and transition distribution P. The controlled Markov process may be converted to a Markov decision process (MDP) by defining a reward function $R: S \times A \rightarrow \mathbb{R}$.

Described herein are reward functions, using distances to goal configurations, or VLM scores for a given input text. Regarding the configurations, each state of S is associated with a specific configuration $q \in Q$, which captures those parts of the state that are relevant to rendering images of the environment in that state. For example, the configuration might include angles or positions of links of a robot and some of the objects with which the robot might interact, and the state might include not only the configuration but also information about the velocities of those bodies. The configuration space Q can be considered to be a subset of a real Euclidean space. Not all configurations may be admissible. For example, there may be inequality constraints corresponding to the requirement that objects do not interpenetrate (unilateral constraints), or to other requirements. The admissible subset of configurations may be denoted $Q^a$.

Regarding the rendering, a rendering function $f_{render}: Q \rightarrow I$ maps configurations to images of the environment. Examples of the rendering function/algorithm include but are not limited to MuJoCo described in E. Todorov, et al., MuJoCo: A physics-based engine for model-based control, IEEE International Conference on Intelligent Robots and Systems, pp. 5026-5033, 2012, or OpenGL described in J. Neider, et al., OpenGL Programming Guide, volume 478, Addison-Wesley, Reading, MA, 1993, which are incorporated herein in their entireties.

The VLM module 620 may be, for example, the CLIP VLM as described in A. Radford, et al., Learning transferable visual models from natural language supervision, International Conference on Machine Learning, p. 8748-8763, 2021, or one of the EVA-CLIP VLMs as described in Q. Sun et al., EVA-CLIP: improved training techniques for CLIP at scale, arXiv: 2303.15389, 2023, which are incorporated herein in their entireties. The present application, however, is also applicable to other VLMs.

The (image) encoding module 408 maps images to an embedding space of dimension d, and is denoted by $f_{image}: \mathcal{I} \rightarrow R^d$. The (text) encoder 608 maps text to the same embedding space $f_{text}: T \rightarrow R^d$.

The space of texts T includes finite strings on a finite vocabulary. The outputs of the encoding modules 408 and 604 may be normalized so that $\| f_{image}(\cdot) \| = 1$ on $\mathcal{I}$ and $\| f_{text}(\cdot) \| = 1$ on T. The scores (image-text similarity scores or VLM scores) generated by the scoring module 608 for a given image $I \in \mathcal{I}$ and text $x \in T$ may be defined as the cosine similarity of their embeddings/encodings:

$$S_{it}(I, x) := f_{image}(I) \cdot f_{text}(x) \tag{1}$$

Combining the rendering with the image-text similarity score enables the scoring module 608 to determine configuration-text similarity scores $S_{qt}$ for a given configuration $q \in Q$ and text $x \in T$ such as $$S_{qt}(q, x) = S_{it}(f_{render}(q), x) \tag{2}$$

To resolve ambiguities that may be present in a single two-dimensional (2D) view, a multiview configuration-text similarity score may be determined by the scoring module 608, for instance by averaging the similarity scores for multiple renderings of the same configuration from different points of view (e.g., on a same horizontal plane) $f_{render,1}$, $f_{render,2}$, . . . , $f_{render,m}$:

$$S_{qt}(q, x) = \frac{1}{m} \sum_{k=1}^{m} S_{it}(f_{render,k}(q), x) = f_{config}(q) \cdot f_{text}(x) \tag{3}$$

where the configuration embedding $f_{config}: Q \rightarrow R^d$ is defined by $$f_{config}(q) := \frac{1}{m} \sum_{k=1}^{m} f_{image} \circ f_{render,k}(q). \tag{4}$$

Alternatively, one may normalize the configuration embedding by dividing it by its 2-norm, defining $$f_{config}(q) := \frac{f_{sum}(q)}{\| f_{sum}(q) \|},\ f_{sum}(q) := \sum_{k=1}^{m} f_{image} \circ f_{render,k}(q). \tag{4'}$$

The VLM module 620 may include a distilled VLM. Given multiple rendering functions and VLMs with a large number of parameters, evaluating the configuration-text similarity score can be costly. Therefore, the present application involves distilling the configuration embedding into a neural network $$\hat{f}_{config}(q) \approx f_{config}(q) \tag{5}$$

Not only is the distilled model $\hat{f}_{config}$ computationally faster than $f_{config}$, but it is also readily differentiated with respect to the configuration. This proves useful when optimizing scores with respect to the configuration. In contrast, the gradients of $f_{render,k}$ and $f_{config}$ may not be defined; and even if they are, the embedding $f_{config}$ may be a highly oscillatory function.

The distilled model may be employed to: sample a diverse dataset for retrieval of k configurations; finetune the resulting configurations; and train an MTRL (multi-task reinforcement learning) agent.

Text-to-goal generation can be described by the following. Given a text x, the selection module 612 or the distilled model finds a configuration q* that maximizes the configuration-text similarity score $$q^* \in \underset{q \in Q^a}{\operatorname{argmax}}\ f_{config}(q) \cdot f_{text}(x).$$

As the similarity score can be multimodal and costly to evaluate, a three-step approach may be used to optimize the similarity score for a given (previously unseen) text, which involves: (i) retrieving k high-scoring configurations from the dataset of precomputed configuration embeddings; (ii) starting from those configurations, performing gradient ascent on an approximate version of the similarity score, based on the distilled model of the configuration embedding; and (iii) selecting from the resulting configurations using the full similarity score (e.g., the multiview score calculated using the VLM). These steps are explained in detail below. Optionally, as discussed above, one may stop immediately after step (i), returning the single best configuration in the dataset with the highest score; or after step (ii), returning the best configuration according to the approximate score.

As the configuration embedding $f_{config}$ is independent of the text, one way to mitigate the cost of optimizing the configuration-text similarity is to work with a dataset of configurations $D:=\{q_1, q_2, \ldots, q_n\} \subset Q^a$ with precomputed configuration embeddings $f_{config}(q)$ for $q \in D$. Given text x, the selection module 612 may select a configuration with a high configuration-text similarity score, such as based on taking dot products with those precomputed embeddings:

$$q_{retrieved} \in \underset{q \in D}{\operatorname{argmax}} f_{text}(x) \cdot f_{config}(q). \tag{6}$$

The effectiveness of this retrieval depends on the choice of the retrieval dataset D (the encodings of the renderings). To ensure high-scoring configurations for any input text (any task), D should include diverse configurations. Three dataset-generation methods are described aiming for diversity, while ensuring admissibility of the resulting configurations.

In various implementations, the dataset may be generated by a random policy of the training module 304. The dataset may be generated by gathering configurations encountered by a random policy interacting with the environment. For maximum diversity, the random policy may uniformly sample actions in the action space. In various implementations, uniform sampling may be used by the training module 304. This dataset is generated by the training module 304 uniformly sampling from a set of admissible configurations $Q^a$. While this guarantees diversity in $Q^a$, it typically does not translate to diversity in the configuration embeddings. In various implementations, the training module 304 may generate the dataset based on embedding/encoding diversity. The training module may focus on creating diversity of configuration embeddings, using the distilled VLM. For example, the training module 304 may optimize a set of configurations by minimizing the following loss on the maximum cosine similarity between embeddings of distinct configurations:

$$L(q_1, \ldots, q_n) = \frac{1}{n}\sum_{i=1}^{n} \max_{j \in [n]/\{i\}} \hat{f}_{config}(q_i) \cdot \hat{f}_{config}(q_j). \tag{6}$$

Regarding the finetuning, even a large retrieval dataset may lack configurations aligned with a given text describing a task. The finetuning may involve refining the k selected configurations. As the exact configuration-text similarity score may be costly to evaluate, attempts are made to maximize a surrogate $\hat{S}_{qt}$ for that score determined by the distilled VLM such as $$\hat{S}_{qt}(q, x) := \hat{f}_{config}(q) \cdot f_{text}(x). \tag{7}$$

By the product rule, the gradient of this surrogate score is $$\nabla_q \hat{S}_{qt}(q, x) = \nabla_q \hat{f}_{config}(q) \cdot f_{text}(x).$$

If some configurations are not admissible, this may not be directly used to perform gradient ascent. Instead, the projection module 624 may use a projection operator $P_{Q^a}$: $Q \rightarrow Q^a$ which maps potentially invalid configurations to nearby admissible configurations. For example, the projection operator may include one or more steps (iterations) of the MuJoCo physics engine incorporate herein in its entirety. This projection may be used to perform projected gradient ascent, with the update $$q^{(j+1)} = P_{Q^a}\left(q^{(j)} + \alpha \nabla_q \hat{S}_{qt}\left(q^{(j)}, x\right)\right) \tag{8}$$

where a is a learning rate. The finetuning may be described by the following algorithm.

Algorithm 1 Gradient-based configuration finetuning

Input: Initial configuration q, Text $x \in T$ , the VLM text encoder $f^{text}$, a distilled model $\hat{f}^{config}$ and a physics projection operator $P_{Q^a}$.
$z_t \leftarrow f^{text}(x)$
while stopping criterion not met do
  $\hat{z}_q \leftarrow \hat{f}^{config}(q)$
  $\hat{S}_{qt} \leftarrow z_t \cdot \hat{z}_q$
  $q \leftarrow q + \alpha \cdot \nabla_q \hat{S}_{qt}$
  $q \leftarrow P_{Qa}(q)$
end while
return q In practice, both the gradient and projection calculations may be parallelizable, allowing concurrent optimization of multiple solutions.

An LCA is a policy π that acts on the environment M to execute a task described in natural language. To craft such policy, low-level control may be decoupled from language grounding. Low-level control is performed by a task-agnostic goal-conditioned reinforcement learning (GCRL) agent, while language is grounded by a text-to-goal method, which provides semantically meaningful sets of goal states (configurations) to the GCRL agent. This decoupling has at least the following two advantages. First, as grounding is independent of low-level control, it is possible to determine whether failures of the LCA are due to poor alignment of the goal with the task description, or to failure of the low-level controller to reach the goal. Second, a large number of goal states may be generated to train a GCRL agent, helping with generalization to new tasks, and this avoids the need to collect a large training set of task descriptions.

In the above, a goal configuration q is fed to a GCRL agent, which has been trained to reach goal configurations. The goal configuration however may be difficult to reach or maintain. For example, the goal configuration might require skillful balancing, even though there are other configurations which would score nearly as highly but not require skillful balancing. As another example, the goal configuration might be far from the current state, even though there are equally highly scoring configurations that are near the current state. For example, given the task "a robot with its arm in the air", one might select a goal configuration in which there is a chair on the right of the scene (the chair is irrelevant to the task, but it is still part of the configuration) and the robot's left arm is in the air, even though the current state involves a chair on the left of the scene and the robot's right arm is in the air. Thus, to reach the goal configuration, the robot may waste time and effort moving the chair and changing the arm that it was holding up.

The following may be performed to overcome the above. First, one or more goal configurations may be selected as described above. Then, the configuration embedding(s) of the one or more goal configurations (e.g., an average over the k selected configurations), and treat that embedding as the goal. This goal embedding may be fed to a GCRL agent that has been trained to maximize the dot product of a goal embedding with the configuration embedding of the robot's state. This is different than the above where the GCRL agent was trained to reach configurations q. The dot product is also unlike the dot product used to compute scores elsewhere above. This is because it is a dot product between two configuration embeddings (image embeddings for given configurations), rather than a dot product between a configuration embedding and a text embedding.

To summarize, rendering functions and a VLM image encoder are used to precompute embeddings of all configurations of the training dataset. Given input text x describing a (previously unseen not in the training dataset) task to be performed by the robot, the text is encoded by a VLM text encoder. The cosine similarity between the text and the precomputed image embeddings are determined, and the k highest scoring configurations are selected. Optionally, the k highest scoring configurations are finetuned by a distilled model. The best configuration may then be fed to the actuation module to execute the task described by the input text.

Figure 7:
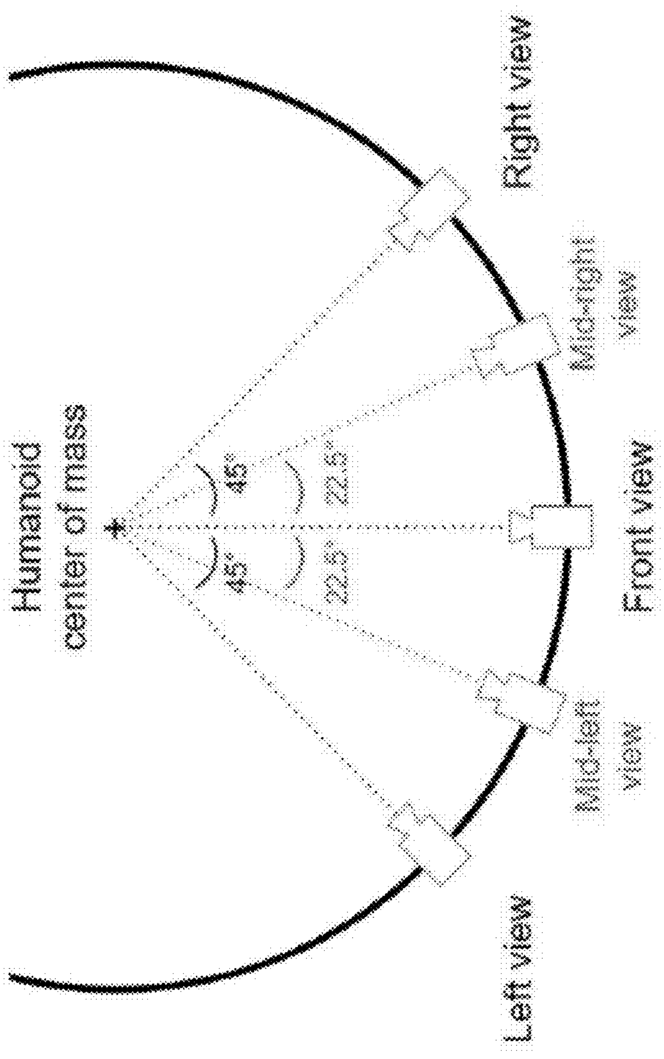
FIG. 7 includes an example illustration of renderings.

In various implementations, the rendering module 404 may perform three renderings of each configuration, such as front view, right view, and left view. FIG. 7 includes an example illustration of these renderings. The corresponding rendering functions may be defined as cameras in an XML file of the environment. They may share other rendering settings and might all point to the robot's center of mass. The cameras may differ in orientation and direction but may be at the same distance from the center of mass. The left, right, and front views may be used to generate the multiview configuration-text scores.

Figure 8:
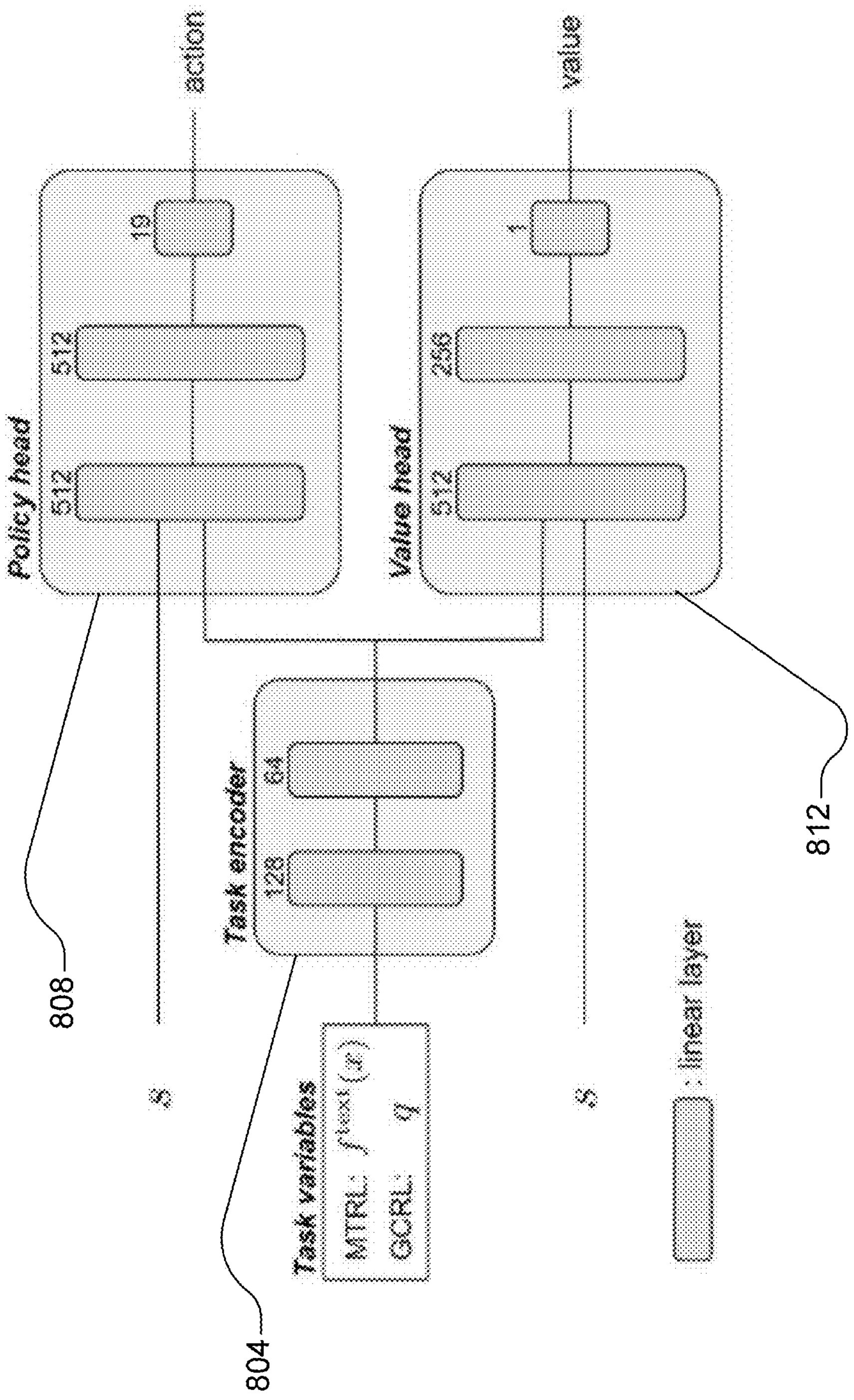
FIG. 8 includes a functional block diagram of an example implementation of agents used by an actuation module.

FIG. 8 includes a functional block diagram of an example implementation of the agents used by the actuation module 616, such as an MTRL agent or a GCRL agent. The state s and task variables are received as input. Three multi-layer perceptron (MLP) modules may be included: (a) a task encoder (module) 804 that embeds the task variables into a vector in $\mathbb{R}^{64}$; (b) a policy head (module) 808 that predicts the action from the concatenation of the state with the embedded/encoded task variables; and (c) a value head (module) 812 that predicts a value from the concatenation of the state with the embedded/encoded task variables. Example numbers of linear layers of each component are shown in FIG. 8. The present application, however, is applicable to other numbers of linear layers and architectures.

Figure 9:
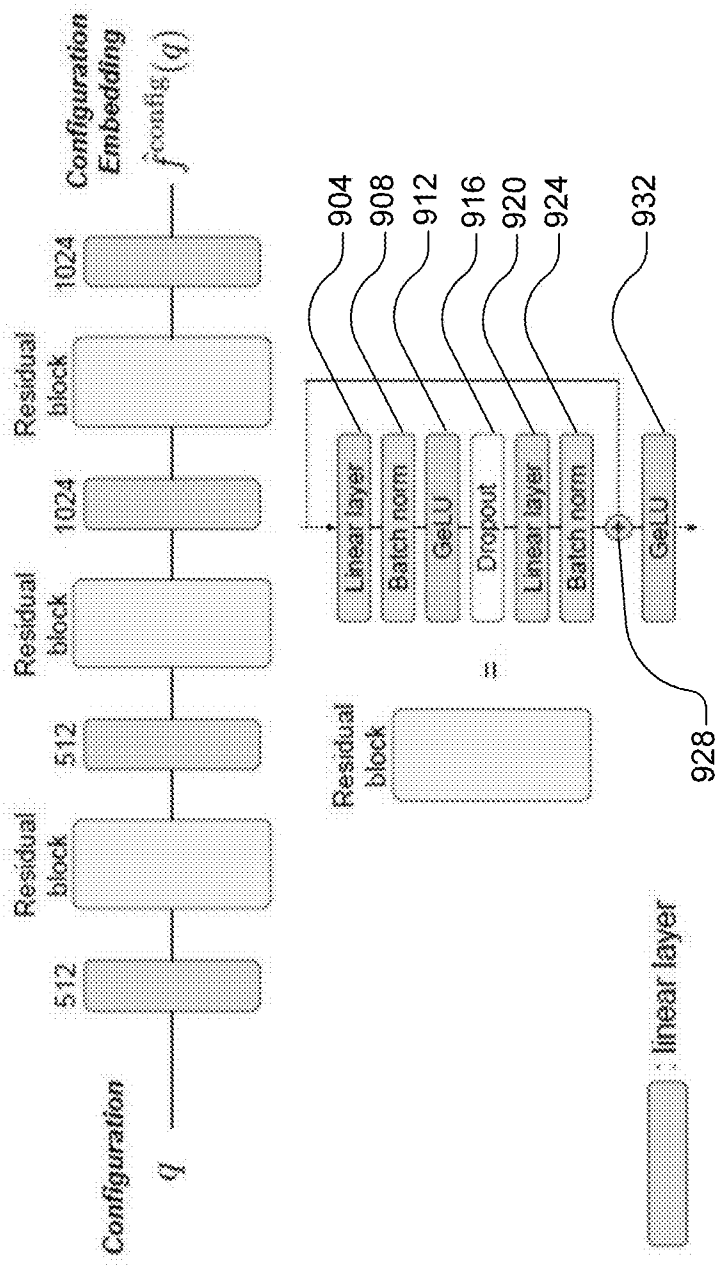
FIG. 9 includes a functional block diagram of an example implementation of a projection module 624 of a distilled model.

FIG. 9 includes a functional block diagram of an example implementation of the projection module 624 of a distilled model. Each selected configuration q is input to the VLM module 620.

Example numbers of linear layers and residual blocks (modules) are shown in FIG. 9. The present application, however, is applicable to other numbers and arrangements of modules. A functional block diagram of each of the residual blocks is also illustrated in FIG. 9. Each residual block may include a linear layer (module) 904 that generates an output based on its input. A batch normalization module 908 generates an output based on the output of the linear layer 904. A Gaussian error linear unit (GeLU) module 912 generates an output based on the output of the batch normalization module 908 using an activation function.

A dropout module 916 generates an output based on the output of the GeLU module 912. For example, the dropout module 916 may generate its output by setting (e.g., randomly chosen) input elements to zero with a predetermined probability. A linear layer (module) 920 may generate an output based on the output of the dropout module 916. A batch normalization module 924 generates an output based on the output of the linear layer 920.

An adder module 928 adds the input with the output of the batch normalization module 924. A GeLU module 932 generates an output based on the output of the batch normalization module 908 using an activation function.

Figure 10:
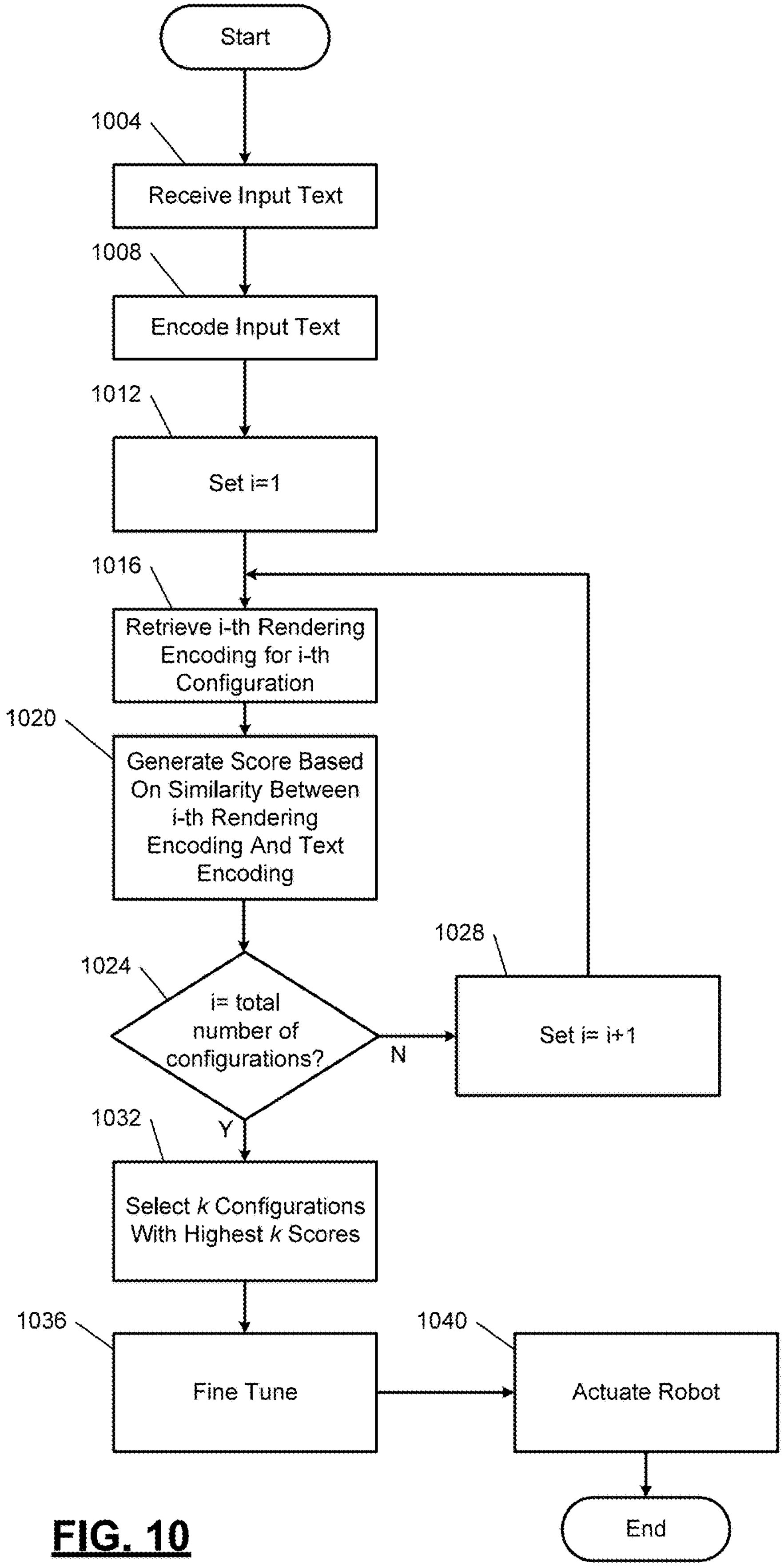
FIG. 10 is a flowchart depicting an example method of actuating a robot.

FIG. 10 is a flowchart depicting an example method of actuating a robot, such as the robot 200. Control begins with 1004 where the encoding module 604 receives input text describing an action to be performed by the robot.

At 1008, the encoding module 604 encodes the text into a text encoding. At 1012, the scoring module 608 may set a counter value i to 1. At 1016, the scoring module 608 retrieves an image/rendering encoding associated with an i-th one of the configurations of the configuration dataset. At 1020, the scoring module 608 generates a score for the i-th configuration based on the similarity between the image/rendering encoding and the text encoding. The scoring module 608 may determine the score by comparing the two encodings, such as using a cosine similarity. At 1024, the scoring module 608 may determine whether the counter value i is equal to a total number of the configurations in the configuration dataset (a total number of the image/rendering encodings stored). If 1024 is true, control may continue with 1032. If 1024 is false, the scoring module 608 may increment the counter value (e.g., i←i+1) at 1028, and control may return to 1016 to score the next one of the configurations. In practice, this iteration process may be performed in parallel on a GPU.

At 1032, the selection module 612 selects k configurations with the k highest scores, respectively. At 1036, the finetuning of the k configurations by the VLM module 620 and the projection module 624 may be performed. At 1040, the actuation module 616 determines how to actuate the robot based on the k configurations and the state variables and actuates the actuators of the robot to achieve the action described by the input text.

Figure 11:
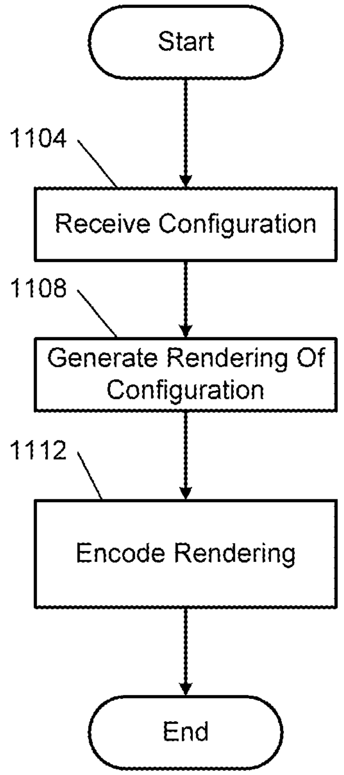
FIG. 11 is a flowchart depicting an example method of generating rendering encodings for actuating a robot.

FIG. 11 is a flowchart depicting an example method of generating the rendering encodings for actuating a robot. Control begins with 1104 where the rendering module 404 receives a configuration. An example of the components of a configuration is provided above. At 1108, the rendering module 1008 renders the configuration to generate an image (a rendering) including a robot posed according to the configuration. At 1112, the image encoding module 408 encodes the rendering to produce an image/rendering encoding. The image encoding module 408 stores the image/rendering encoding for later use, such as described above in conjunction with FIG. 10. FIG. 11 is performed for each of the configurations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robot system comprising:

image encodings generated based on image renderings of configurations, respectively of a robot in an environment, each of the configurations including positions and orientations of portions of the robot;

an encoding module configured to receive text descriptive of an action to be performed by the robot and to encode the text into a text encoding;

a scoring module configured to generate scores for the configurations based on comparisons of (a) the text encoding with (b) the image encoding of the respective configuration;

a selection module configured to select k of the configurations based on the scores, where k is an integer greater than or equal to 1; and an actuation module configured to actuate the robot based on the selected k of the configurations based on actuating the robot to achieve the action described in the text.

2. The robot system of claim 1 wherein the scoring module is configured to generate the scores using cosine similarity.

3. The robot system of claim 1 wherein the selection module is configured to select k of the configurations with the k highest scores.

4. The robot system of claim 1 wherein the renderings include at least two different image renderings of each configuration from different points of view.

5. The robot system of claim 4 wherein the different points of view are on a same horizontal plane.

6. The robot system of claim 1 further comprising a vision-language model (VLM) module and a projection module configured to finetune the selected k of the configurations, wherein the actuation module is configured to actuate the robot based on the k finetuned selected configurations.

7. The robot system of claim 1 further comprising a projection module configured to finetune the selected k configurations based on one of gradient ascent and projected gradient ascent.

8. The robot system of claim 1 wherein the scoring module is configured to generate a score for one of the configurations based on (a) a first score for the one of the configurations generated based on a first comparison of the text encoding with a first image encoding of the one of the configurations generated based on a first point of view and (b) a second score for the one of the configurations generated based on a second comparison of the text encoding with a second image encoding of the one of the configurations generated based on a second point of view that is different than the first point of view.

9. The robot system of claim 8 wherein the scoring module is configured to generate the score for the one of the configurations based on an average of the first score and the second score.

10. The robot system of claim 1 wherein the encoding module is configured to encode the text using a vision-language model (VLM) text encoding algorithm.

11. The robot system of claim 1 wherein the encoding module includes a neural network configured to encode the text.

12. The robot system of claim 1 wherein each of the configurations includes three-dimensional coordinates of a portion of the robot in the environment.

13. The robot system of claim 1 wherein each of the configurations includes angles of a joint of the robot in the environment.

14. The robot system of claim 1 wherein each of the configurations includes three-dimensional coordinates of an object to be acted upon by the robot in the environment.

15. The robot system of claim 1 wherein each of the configurations includes at least one dimension describing the orientation of an object to be acted upon by the robot in the environment.

16. The robot system of claim 1 wherein the image encodings are generated using a vision-language model (VLM) image encoding algorithm based on the image renderings of configurations.

17. The robot system of claim 1 wherein the image renderings are generated using a MuJoCo rendering algorithm.

18. A training system comprising:

the robot system of claim 1;

a rendering module configured to generate the image renderings based on the configurations, respectively; and a second encoding module configured to encode the image renderings into the image encodings, respectively.

19. A robot system comprising:

image encodings generated based on image renderings of configurations, respectively of a robot in an environment, each of the configurations including positions and orientations of portions of the robot;

an encoding module configured to receive text descriptive of an action to be performed by the robot and to encode the text into a text encoding;

a scoring module configured to generate scores for the configurations based on comparisons of (a) the text encoding with (b) the image encoding of the respective configuration;

a selection module configured to select k of the configurations based on the scores, where k is an integer greater than or equal to 1; and an actuation module configured to actuate the robot based on a dot product of the k image encodings of the selected k of the configurations and actuating the robot to achieve the action described in the text.

20. A method comprising:

receiving image encodings generated based on image renderings of configurations, respectively of a robot in an environment, each of the configurations including positions and orientations of portions of the robot;

receiving text descriptive of an action to be performed by the robot and to encode the text into a text encoding;

generating scores for the configurations based on comparisons of (a) the text encoding with (b) the image encoding of the respective configuration;

selecting k of the configurations based on the scores, where k is an integer greater than or equal to 1; and actuating the robot based on the selected k of the configurations based on actuating the robot to achieve the action described in the text.

21. A robot system comprising:

image encodings generated based on renderings of configurations, respectively of a robot, the configurations including at least a predetermined number of different poses of the robot in an environment;

an encoding module configured to receive text descriptive of an action to be performed by the robot and to encode the text into a text encoding;

a scoring module configured to generate scores for the configurations based on comparisons of (a) the text encoding with (b) the image encoding of the respective configuration;

a selection module configured to select k of the configurations based on the scores, where k is an integer greater than or equal to 1; and an actuation module configured to actuate the robot based on the selected k of the configurations based on actuating the robot to achieve the action described in the text, wherein the scoring module is configured to generate a score for one of the configurations based on (a) a first score for the one of the configurations generated based on a first comparison of the text encoding with a first image encoding of the one of the configurations generated based on a first point of view and (b) a second score for the one of the configurations generated based on a second comparison of the text encoding with a second image encoding of the one of the configurations generated based on a second point of view that is different than the first point of view.

* * * * *